Patented Jan. 23, 1923.

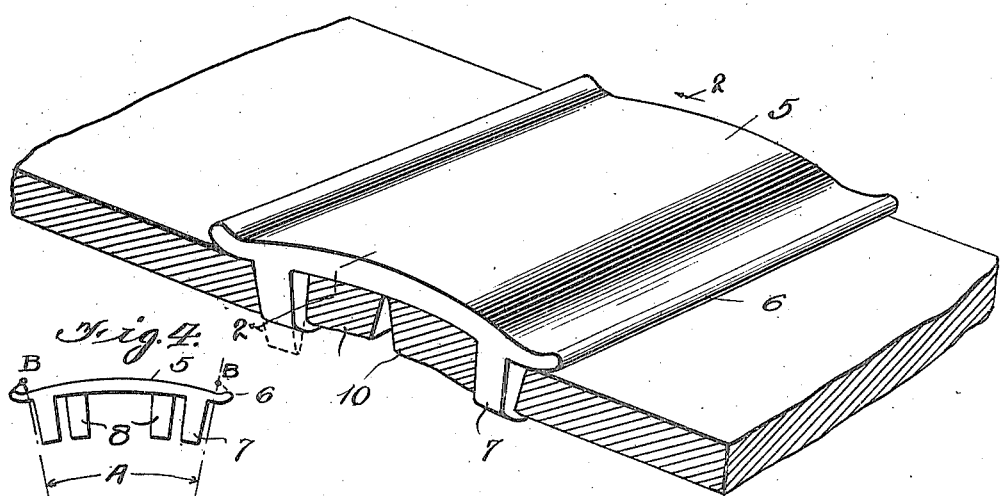
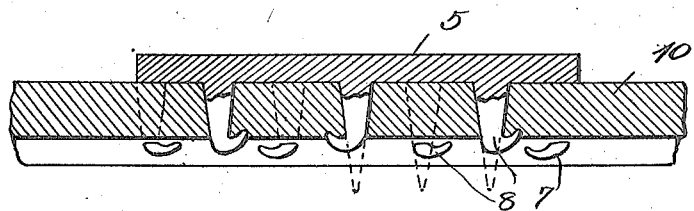
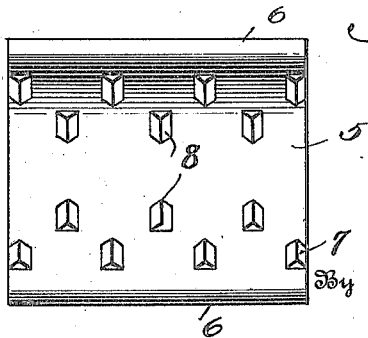

1,443,210

UNITED STATES PATENT OFFICE.

WILLIAM H. BRADSHAW, OF LANSDOWNE, PENNSYLVANIA, ASSIGNOR TO MAIN BELTING COMPANY, OF PHILADELPHIA, PENNSYLVANIA, A CORPORATION OF PENNSYLVANIA.

BELT FASTENER.

Application filed May 23, 1921. Serial No. 471,686.

*To all whom it may concern:*

Be it known that I, WILLIAM H. BRADSHAW, a citizen of the United States, residing at Lansdowne, in the county of Delaware and State of Pennsylvania, have invented certain new and useful Improvements in Belt Fasteners, of which the following is a specification.

This invention relates to improvements in belt fasteners and more particularly to that type of fastener so constructed and arranged as to engage the adjacent ends of a belt and hold the same in relatively fixed position.

One of the objects of the present invention is to provide an improved belt fastener of simple and practical construction which may be easily and inexpensively manufactured.

A further object is to provide a belt fastener of the above character that may be readily made of any desired material either cast or stamped from sheet metal or constructed from malleable iron and assembled with the adjacent ends of the belt with a minimum amount of trouble and expense.

A further object is to provide a belt fastener of the above character which will more reliably and efficiently cooperate with the adjacent ends of the belt in a manner to prevent tearing out at the point of connection and also prevent breakage or cracking of the belt adjacent the edge of the belt fastener as so often occurs with the present types of constructions.

Heretofore, with certain types of belt fasteners there has been a decided tendency when applied to multiply fabric belts to crack or break the belt along a line adjacent to the fastening devices due to change in angularity between the straight run of the belt and that portion that bends upwardly into the fastener when used with a curved form of fastener of the type as hereinafter described. This objection is thought to be overcome by the present invention by continuing the body portion of the belt fastener with the same curvature beyond this line a slight distance and then curving the same slightly upwardly thereby to shift the point of change of angularity of the belt which occurs as the hook or fastener approaches and leaves the pulley.

It is believed that the above and other objects will be clear from the following description, when taken in connection with the annexed sheet of drawings showing one of the various forms of the invention.

In this sheet of drawings where similar reference characters denote corresponding parts in the several views,—

Figure 1 is a perspective sectional view showing a belt fastener as applied to the adjacent ends of a belt;

Figure 2 is a sectional view taken along the line 2—2 of Figure 1;

Figure 3 is a bottom plan view; and

Figure 4 is a side view.

Referring now to the drawings in detail and more particularly to Figure 1, 5 denotes the body portion of the belt fastener which is preferably made of malleable iron. This body portion is curved slightly throughout the distance indicated by arc A, Figure 4, in one direction whereby the belt will more easily conform to the curvature of a pulley as it passes thereabout. The adjacent sides indicated by the extent covered by arc B shown in Figure 4 constitutes a reverse curve terminating in a rounded straight edge 6 along each side.

A slight distance back from the edges 6 are positioned at each side a row of wedge shaped teeth 7, reinforced by a second row of teeth 8, arranged in staggered relation in respect thereto. These teeth are flat or wedge shaped and when applied to the belt are adapted to enter between the longitudinal threads of the several plies of the fabric, thus preventing a cutting of these threads and a weakening of the ends whereby the teeth would more readily pull out at the ends of the fabric or belt as indicated at 10 in Figure 1.

In applying this fastener to the adjacent ends of the belt, the body portion 5 is preferably placed upon a block shaped to conform to the curvature of the back of the fastener with the teeth pointing upwardly. The adjacent ends of the belt are then driven down upon the teeth so that they perforate the fabric, and when the ends of the belt are pressed into tight engagement with the back of the body portion then these teeth are bent over in opposite directions thereby to securely hold the belt ends in this clamped position.

It will be noted particularly that the side edges 6 of the fastener project beyond these rows of teeth with the same curvature as the body portion a short distance before they are curved upwardly. By so continuing the body portion to form a hook upon the outer edge of the outer row of teeth 7 a slight distance on the same arc of curvature as on the inner face of the hook, and then reversing the curvature on the inner face to make it follow an arc of a small radius for a slight distance, it insures that the belt does not bend sharply at the point where the teeth have made holes through the fabric and shifts the line of bending to the end of area A.

It is believed from extensive investigations that if the bending takes place at a point adjacent the holes made by the teeth the belt will start to crack across its back, whereas if the bend does not occur there, but at a short distance beyond where there are no holes through the belt, cracking will not so easily occur and the life of the belt will be increased one hundred or more per cent. Variation in size and proportion of the fastener is desired according to the use or size of the pulley to which the belt is to be applied. One of the objects of the fastener as a whole is to obtain a join that will conform to the proper diameter of the pulley and at the same time enable the belt to bend out straight without the edge of the hook cutting into the surface of the belt.

It is believed from the above description that the construction, method of use and application will be clear to those skilled in the art and a further statement thereof is unnecessary.

The invention is of simple and practical construction, reliable and efficient in use and operation and adapted to accomplish among others the objects and advantages herein set forth.

I claim as my invention:

1. A device of the character described for connecting the adjacent ends of a belt comprising a body member having a slightly curved surface portion against which an end of the belt is adapted to be securely clamped and having a substantially straight outer edge, means associated with said body portion adapted to pass through the belt and hold the same in clamped position at a plurality of points substantially parallel to said edge, said substantially straight edge being at a slight distance from said fastening means and curved reversely with respect to the curvature of the body portion of the fastener, thereby to prevent breakage or cracking of the belt along a line parallel and closely adjacent said fastening means.

2. A device of the character described for connecting the adjacent ends of a belt comprising a body member slightly curved in order to better conform to the curvature of a pulley about which the belt is adapted to pass, said body member having substantially straight edges transversely disposed with respect to the length of the belt, and a plurality of fastening devices positioned almost adjacent said edges and formed integrally with said body member, the portion of said body member between said fastening devices continuing with the curvature of the body of the hook and then being curved reversely to the curvature of the main part of said body member thereby to prevent the edges of said body member from coacting or engaging with said belt surface adjacent the fastening device.

3. A device of the character described for connecting the adjacent ends of a belt comprising a body member slightly curved in order to better conform to the curvature of a pulley about which the belt is adapted to pass, and curved reversely to said previous curvature near the longitudinal extremities of said member, said body member having a plurality of rows of wedge shaped fastening devices adapted to perforate the adjacent edges of the belt and be bent over to clamp the belt ends to the body portion, said wedge shaped fastening device being disposed longitudinally with respect to the length of the belt and a slight distance from the edges thereof.

4. A device of the character described for connecting the adjacent ends of a belt comprising a body member slightly curved in order to better conform to the curvature of a pulley about which the belt is adapted to pass, said body member having a plurality of rows of wedge shaped fastening devices adapted to perforate the adjacent ends of the belt and be bent over to clamp the belt ends to the body portion, said wedge shaped fastening devices being disposed longitudinally with respect to the length of the belt, said body portion having its substantially straight transverse edges on a slight distance from said rows of fastening devices, said curved body portion extending beyond the line of fastening devices with substantially the same curvature and then being curved reversely with respect to the main part of said body member.

5. A device of the character described for connecting the adjacent ends of a belt comprising a body member slightly curved in order to better conform to the curvature of a pulley about which the belt is adapted to pass, said body member having a plurality of rows of fastening devices adapted to perforate the adjacent ends of the belt, said body portion having its edges a slight distance from said rows of fastening devices, said curved body portion extending beyond the line of fastening devices with substantially the same curvature and then being curved reversely with respect to the main part of said body member.

6. A device of the character described for connecting the adjacent ends of a belt comprising a body member of general rectangular shape, the major part of which is curved slightly in order to more smoothly pass around a pulley and having a plurality of rows of wedge shaped teeth adjacent each transverse edge, said teeth being positioned in staggered relation and longitudinally disposed with respect to the length of the belt thereby to prevent a cutting of the longitudinal strands of the fabric on application to the belt ends, the outer of said rows of teeth being positioned a slight distance inwardly from the adjacent edge of the body member, said curved body portion extending beyond the line of teeth with substantially the same curvature and then being curved reversely with respect to the body portion, thereby shifting the point of angularity in the belt and preventing a sharp line of engagement between the body member and the surface of the belt to which it is applied.

In testimony whereof I affix my signature.

WILLIAM H. BRADSHAW.